E. J. & E. M. LOCKHART.
ARTIFICIAL BAIT.
APPLICATION FILED AUG. 21, 1913.

1,113,361.

Patented Oct. 13, 1914.

Witnesses

E. J. Lockhart and
E. M. Lockhart
Inventors by C. A. Snow & Co.
Attorneys

UNITED STATES PATENT OFFICE.

EDWARD J. LOCKHART AND EVELYN M. LOCKHART, OF GALESBURG, MICHIGAN.

ARTIFICIAL BAIT.

1,113,361.   Specification of Letters Patent.   Patented Oct. 13, 1914.

Application filed August 21, 1913.  Serial No. 786,025.

*To all whom it may concern:*

Be it known that we, EDWARD J. LOCKHART and EVELYN M. LOCKHART, citizens of the United States, residing at Galesburg, in the county of Kalamazoo, State of Michigan, have invented a new and useful Artificial Bait, of which the following is a specification.

The present invention appertains to artificial fishing baits or lures, and is particularly an improvement over the devices disclosed in Patents Nos. 923,670 and 1,009,077 issued June 1, 1909, and November 21, 1911, respectively.

It is the object of the present invention to provide a novel and simple attachment for a buoyant or flotative hook-carrying bait body, and providing oppositely disposed inclined water passages at the sides of the body, whereby it may be made to dive and travel under the surface of the water, when drawn forwardly by means of the line.

It is also the object of the present invention to provide an attachment of the nature indicated which will impart a sidewise or lateral thrust to the body, when drawn through the water, in order that the body will simulate the movements of a wounded minnow or live bait.

With the foregoing general objects outlined and with other objects in view, which will be apparent as the nature of the invention is better understood, the present invention resides in the combination and arrangement of parts and in the details of constructon hereinafter described and claimed, it being understood that changes in the precise embodiment of the invention herein disclosed can be made within the scope of what is claimed without departing from the spirit of the invention.

Figure 1:
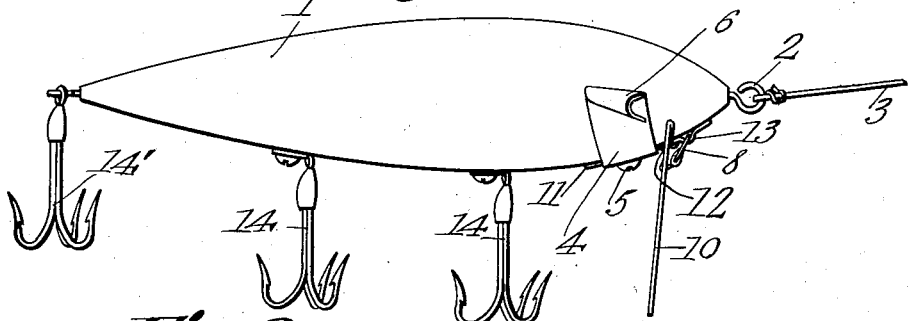
Figure 2:
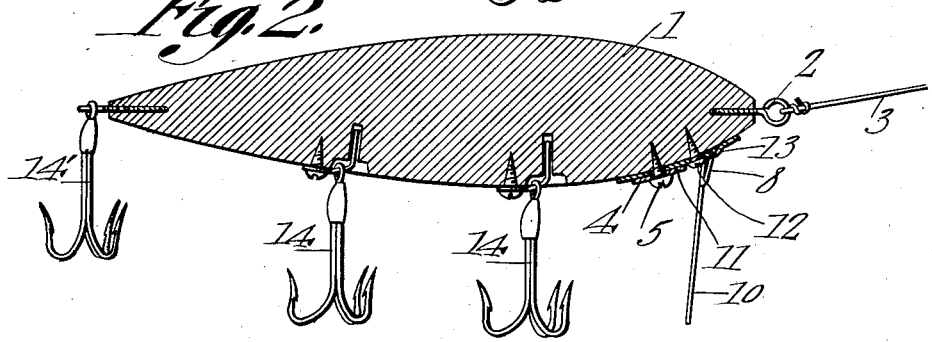
Figure 4:
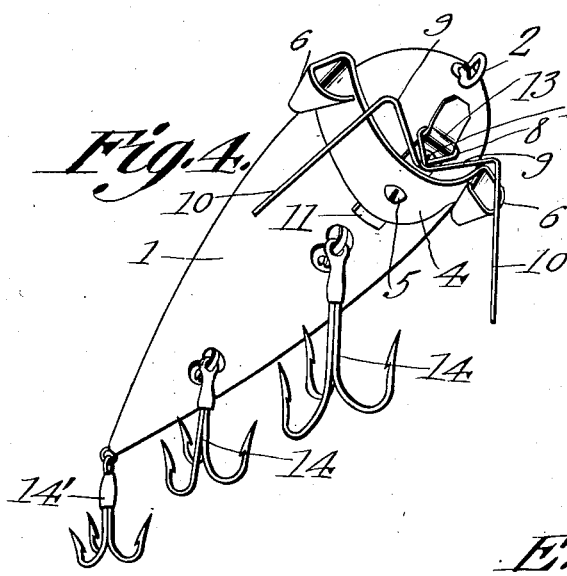
Figure 3:
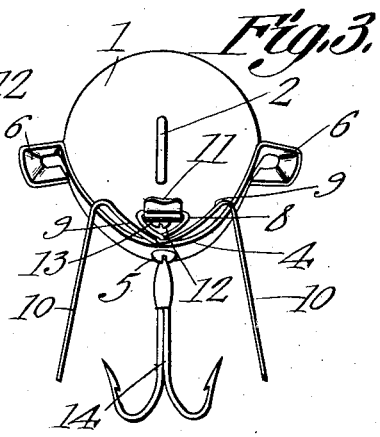

The invention has been illustrated in its preferred embodiment in the accompanying drawing, wherein:—Figure 1 is a side elevation of the improved bait or lure. Fig. 2 is a longitudinal section thereof. Fig. 3 is a front end view of the device, on a slightly enlarged scale. Fig. 4 is a perspective view of the device.

In carrying out the present invention, reference being had in detail to the drawings, there is provided a bait body 1 constructed of wood or other buoyant or flotative material, and preferably of fusiform or ovoid contour, the surface of the body being finished in any desirable manner to lure or attract the larger fish. The body 1 is provided at its forward end with an eye screw or other means 2 for the attachment of the line 3, in order that the body may be readily drawn forward through the medium of the line.

The improved attachment is preferably fashioned from a strip or elongated plate of sheet metal 4, the body of which is of arcuate form so as to fit the bottom of the body 1 adjoining its forward end with the terminals of the strip or plate 4 disposed at the sides of the body. The strip or plate 4 is attached at its intermediate point to the bottom of the body 1, by means of a screw or other securing member 5, passing through an aperture provided in the strip 4 and taking into the body, whereby the plate 4 will be clamped snugly against the bottom portion of the body. The terminals of the plate 4 are curled or bent back outwardly to provide the "tubes" or water passages 6 at the sides of and independent of the body. The tubes 6 are tapered rearwardly, and their axes are also inclined rearwardly, to carry out the functions desired.

A detachable weed guard may be employed, similar to that disclosed in the co-pending application Serial No. 782,972. The weed guard is bent from a length of suitable wire, the wire having its intermediate portion twisted into an eyelet or loop 8, and being bent back to provide diverging arms 9, and then having its terminal portions bent angularly from the arms 9 to provide the antennæ or feelers 10 for deflecting weeds or other foreign matter out of the path of the hooks carried by the body. The weed guard is detachably carried by the body 1 by means of a spring tongue 11 fashioned from a strip of metal, the tongue 11 resting snugly against the bottom of the body 1 adjoining its forward end, with the rear end of the tongue 11 clamped between the intermediate portion of the strip 4 and the body. The screw 5 is preferably passed through the spring tongue 11, and a screw or securing member 12 is passed through an aperture provided in the tongue 11 directly in advance of the strip or member 4 to hold the forward end of the tongue against the body. The tongue 11 is provided with a crimp or transverse corrugation 13 adjoining its forward end, or directly in advance of the screw 12, the eyelet or loop 8 of the weeed guard being normally engaged by the crimp or corrugation 13 to pivotally support the guard. The arms 9 of the weed guard are bent or curved to conform to the bottom of the body 1, to thereby limit the rearward movement of the weed guard, and to provide a compact and desirable arrangement. It is evident that the weed guard may be readily detached by loosening the screw 12, so that the loop or eyelet 8 may be slipped out of engagement with the forward end portion of the tongue.

The weed guard is desirable when the bait is employed in weedy water, such as lily ponds, and the like, and it is preferable to remove or omit the weed guard when the bait is employed in open waters.

The body 1 carries any number of suitable hooks, a pair of hooks 14 being loosely carried by the bottom of the body 1, as illustrated in the drawing, and a tail or trailing hook 14' being carried by the rear end or tail of the body, although it is understood that the number or arrangement of the hooks is of no particular moment. The hooks 14 and 14' may be of the single, double or treble type, and the hooks 14 are preferably attached to the body 1 as disclosed in the aforesaid co-pending application.

In using the improved bait including the attachment described and illustrated, the bait is cast in the usual fashion, and will float under ordinary conditions when the line is slackened. By pulling or jerking the line 3, through the medium of the fishing pole, or reel, the bait may be made to dive under the surface of the water, in an efficient manner, this resulting from the passage of the water through the tubes 6. It is evident that the inclination of the tubes 6 will give a downward thrust to the body when the body is drawn forward through the water, and consequently, the bait will travel under the surface of the water as long as the line is drawn forwardly. The depth to which the bait will descend or submerge, depends upon the velocity at which the line is drawn, and after the line is slackened, the bait will rise to the surface. The tubes 6 being oppositely disposed, or being arranged at the sides or opposite portions of the body, will impart a sidewise or lateral motion to the body, when the body is drawn through the water, in order that the bait may simulate the movements of a minnow or live bait, especially as when pursued by a larger fish. The tapered form of the tubes 6, will establish a resistance to the ready flow of the water therethrough, as the bait is drawn through the water, and this resistance established by the opposite tubes, will vary in practice, when the bait is drawn through the water and as a result of the variance in the resistance provided by the two tubes, the body of the bait will be given a tendency to move laterally or sidewise. Thus, should the resistance offered by one tube, be greater than the resistance offered by the other, due to natural conditions in the passage of the bait through the water, the bait body will be moved to one side, due to the drag created at one side by that tube providing the greatest resistance to the passage of water therethrough. Thus, the tapered form of the tubes, and the positioning of the tubes at the opposite sides of the bait body, will cause the bait to simulate the movements of a minnow, when the bait is drawn through the water.

The present attachment will efficiently carry out the desired functions, whereby the bait, as a whole, will serve as an attractive lure for the larger fish, enabling the fisherman to quickly attract and catch the large fish, it being understood, of course, that the larger fish in attempting to bite or swallow the bait, will be snagged or caught by the hooks, The body 1 may also be made in various sizes or styles, for attracting various species of fish, and the present invention is otherwise susceptible of alterations or modifications, within the scope of the appended claims, without departing from the spirit of the invention.

Having thus described the invention, what is claimed as new is:—

1. In an artificial bait, a buoyant hook-carrying body, and a member attached thereto and provided with inclined water passages at the sides of and independent of the body.

2. In an artificial bait, a buoyant hook-carrying body, and a member attached to the bottom thereof and provided with rearwardly inclined water passages at the sides of and independent of the body.

3. In an artificial bait, a buoyant hook-carrying body, and tubes carried by and independent of the body and arranged at opposite portions thereof.

4. In an artificial bait, a buoyant hook-carrying body, and inclined tubes carried by and independent of the body, and arranged at the sides thereof.

5. In an artificial bait, a buoyant hook-carrying body, and a member having its intermediate portion attached thereto and having its terminals provided with water passages.

6. In an artificial bait, a buoyant hook-carrying body, and a sheet metal strip attached at its intermediate portion thereto, and having its terminals bent to provide water passages at the sides of the body.

7. In an artificial bait, a buoyant hook carrying body of fusiform contour, and an arcuate member having its intermediate portion attached to the body, and having its terminals provided with rearwardly inclined water passages at the sides of the body.

8. In an artificial bait, a buoyant hook carrying body of fusiform contour, and an arcuate sheet metal strip attached at its intermediate portion to the bottom of the body, and having its terminals curled back to provide rearwardly inclined tubes at the sides of the body.

9. In an artificial bait, a buoyant hook-carrying body, and a member attached thereto and provided with water passages at opposite portions of and independent of the body.

10. In an artificial bait, a buoyant hook-carrying body, and a member having its intermediate portion attached thereto and having its terminals provided with tubes at opposite portions of the body.

11. In an artificial bait, a buoyant hook-carrying body, and a strip having its intermediate portion attached thereto, having its terminals formed with inclined tubes at the sides of the body.

12. In an artificial bait, a buoyant hook-carrying body of fusiform contour, and an arcuate member having its intermediate portion attached to the body, and having its terminals provided with water passages at opposite portions of the body.

13. In an artificial bait, a buoyant hook-carrying body of fusiform contour, and an arcuate sheet metal strip attached at its intermediate portion to the body, and having its terminals curled back to provide tubes at opposite portions of the body.

In testimony that we claim the foregoing as our own, we have hereto affixed our signatures in the presence of two witnesses.

EDWARD J. LOCKHART.
EVELYN M. LOCKHART.

Witnesses:
 SIDNEY DUNN,
 CARL CLAPP.